US011255339B2

(12) United States Patent
Alstad et al.

(10) Patent No.: US 11,255,339 B2
(45) Date of Patent: Feb. 22, 2022

(54) FAN STRUCTURE HAVING INTEGRATED ROTOR IMPELLER, AND METHODS OF PRODUCING THE SAME

(71) Applicant: HONEYWELL INTERNATIONAL INC., Morris Plains, NJ (US)

(72) Inventors: Shawn Alstad, Phoenix, AZ (US); Peter Hall, Phoenix, AZ (US); Ryan Bonde, Phoenix, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 537 days.

(21) Appl. No.: 16/115,124

(22) Filed: Aug. 28, 2018

(65) Prior Publication Data

US 2020/0072232 A1 Mar. 5, 2020

(51) Int. Cl.

| | |
|---|---|
| ***F04D 29/32*** | (2006.01) |
| ***F04D 29/02*** | (2006.01) |
| ***F04D 19/00*** | (2006.01) |
| *B33Y 80/00* | (2015.01) |
| *B33Y 10/00* | (2015.01) |

(52) U.S. Cl.

CPC ......... *F04D 29/023* (2013.01); *F04D 19/002* (2013.01); *F04D 29/325* (2013.01); *B33Y 10/00* (2014.12); *B33Y 80/00* (2014.12); *F05D 2230/22* (2013.01); *F05D 2230/31* (2013.01)

(58) Field of Classification Search

CPC ...... F04D 29/023; F04D 29/181; F04D 29/32; F04D 29/325; F04D 29/326; F04D 29/329; F04D 29/40; F04D 25/0613; F04D 25/066; F04D 25/0693; F04D 25/08; F04D 19/002; F04D 19/022

See application file for complete search history.

(56) References Cited

U.S. PATENT DOCUMENTS 6,309,178 B1 * 10/2001 Kim ......................... F01P 11/10 415/176
6,813,328 B2 * 11/2004 Kitch .................. G21C 15/243 376/406
8,651,807 B2 * 2/2014 Inada .................... F04D 29/667 415/208.2

(Continued)

FOREIGN PATENT DOCUMENTS

WO WO-2017080591 A1 * 5/2017 ......... F04D 13/0626

*Primary Examiner* — Courtney D. Heinle
*Assistant Examiner* — Danielle M. Christensen
(74) *Attorney, Agent, or Firm* — Lorenz & Kopf, LLP

(57) ABSTRACT

A fan structure having integrated rotor impeller, and methods of producing the same are provided. The fan structure includes a fan housing that encircles a longitudinal axis, and defines an airflow direction from an inlet side to an exit side. The integrated rotor impeller structure is disposed to rotate within the fan housing. The integrated rotor impeller structure includes (a) a cylindrical rotor shell being annular about the longitudinal axis, and having a shell length, and (b) an axis rod coaxial with the longitudinal axis, and having an axis rod length of less than or equal to the shell length. An airflow annulus is created therebetween. A blade is disposed within the airflow annulus to extend radially from the external surface of the axis rod to the inside surface of the the cylindrical rotor shell. One or more magnets are integrated within the integrated rotor impeller structure.

14 Claims, 4 Drawing Sheets

(56) References Cited

U.S. PATENT DOCUMENTS

| | | | | |
|---|---|---|---|---|
| 8,708,668 | B2 | 4/2014 | Tanaka et al. | |
| 8,851,942 | B2 | 10/2014 | Yoshikawa et al. | |
| 9,956,332 | B2 | 5/2018 | LaRose et al. | |
| 2007/0126297 | A1 | 6/2007 | de Zwart et al. | |
| 2008/0193287 | A1* | 8/2008 | Kobayashi | B29C 45/26 415/208.2 |
| 2014/0169971 | A1 | 6/2014 | Vedula et al. | |
| 2017/0159663 | A1* | 6/2017 | Jang | F04D 25/0606 |
| 2018/0313354 | A1* | 11/2018 | Wegener | F04D 13/064 |
| 2019/0234419 | A1* | 8/2019 | Dygert | A47F 3/0447 |

* cited by examiner

FAN STRUCTURE HAVING INTEGRATED ROTOR IMPELLER, AND METHODS OF PRODUCING THE SAME

TECHNICAL FIELD

The present disclosure generally relates to fan structures for use in electric blower motors, and more particularly relates to an integrated rotor impeller and fan structures based thereon, and methods of producing the same.

BACKGROUND

Electric blower motors are common on many vehicles such as aircraft, spacecraft, automobiles, boats, and trains. Electric blower motors are generally employed to move large volumes of air from some type of environmental control system or Heating Ventilation and Air Conditioning (HVAC) system. As used in aircraft, the electric blower motors are often used inline with a closed air system.

A component of the electric blower motor is the fan structure, which generally includes an arrangement of one or more fan blades. Airflow travels through the fan structure in a designated airflow cavity. The fan structure presents several technological challenges. In many designs, various impediments are located in the airflow cavity and impinge the airflow. In some cases, the impediments are physical components, such as stationary ribs. In addition, the shape of the airflow cavity itself can impinge the airflow, particularly, as in many available fan structures, when the airflow cavity requires airflow to travel through narrow channels with turns and angles that are a direct result of the design of the fan structure. In addition to airflow impingement, available fan structures often have a high part count and are not weight optimized.

Accordingly, design improvements to fan structures are desirable. It is further desirable to address these technological challenges at a fundamental building block level. It is desirable, therefore, to integrate components and reduce part count. It is also desirable to have a fan structure that maximizes the use of additive manufacturing (AM) techniques. Furthermore, other desirable features and characteristics of the present embodiments will become apparent from the subsequent detailed description and the appended claims, taken in conjunction with the accompanying drawings and this background of the invention.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In an embodiment, a fan structure for an electric motor is provided. The fan structure includes: a fan housing encircling a longitudinal axis, the fan housing defining an airflow direction from an inlet side to an exit side; an integrated rotor impeller structure disposed to rotate within the fan housing, the integrated rotor impeller structure defined by (a) a cylindrical rotor shell being annular about the longitudinal axis, the cylindrical rotor shell having a shell length; (b) an axis rod coaxial with the longitudinal axis, the axis rod having an axis rod length of less than or equal to the shell length; (c) an airflow annulus aligned with the longitudinal axis and extending from an external surface of the axis rod to an internal surface of the cylindrical rotor shell; (d) a blade disposed within the airflow annulus and extending radially from the external surface of the axis rod to the inside surface of the cylindrical rotor shell; and (e) a magnet, the magnet integrated within the rotor impeller structure.

An integrated rotor impeller structure is provided. The integrated rotor impeller structure fabricated using an additive manufacturing process, for use in a fan housing that encircles a longitudinal axis and defines an airflow direction from an inlet side to an exit side, the integrated rotor impeller structure includes: (a) a cylindrical rotor shell being annular about the longitudinal axis, the cylindrical rotor shell having a shell length; (b) an axis rod coaxial with the longitudinal axis, the axis rod having an axis rod length of less than or equal to the shell length; (c) an airflow annulus aligned with the longitudinal axis and extending from an external surface of the axis rod to an internal surface of the cylindrical rotor shell; (d) a blade disposed within the airflow annulus and extending radially from the external surface of the axis rod to the inside surface of the cylindrical rotor shell; and (e) a magnet, the magnet integrated within the rotor impeller structure.

Also provided is a method for creating an integrated rotor impeller structure. The method includes: determining an inside diameter of a fan housing that encircles a longitudinal axis; defining, (a) a cylindrical rotor shell as being annular about the longitudinal axis, having an outside diameter smaller than the inside diameter of the fan housing, but more than 80 percent of the inside diameter of the fan housing, and having a shell length; (b) an axis rod as being coaxial with the longitudinal axis and having an axis rod length of less than or equal to the shell length; (c) a blade extending radially from an external surface of the axis rod to an inside surface of the cylindrical rotor shell; assembling the cylindrical rotor shell and axis rod to create an airflow annulus between an external surface of the axis rod and an internal surface of the cylindrical rotor shell aligned with the longitudinal axis; disposing the blade within the airflow annulus; and integrating a magnet within the rotor impeller structure.

Furthermore, other desirable features and characteristics of the system and method will become apparent from the subsequent detailed description and the appended claims, taken in conjunction with the accompanying drawings and the preceding background.

BRIEF DESCRIPTION OF THE DRAWINGS

The present embodiments will hereinafter be described in conjunction with the following drawing figures, wherein like numerals denote like elements, and wherein.

DETAILED DESCRIPTION

Figure 1:
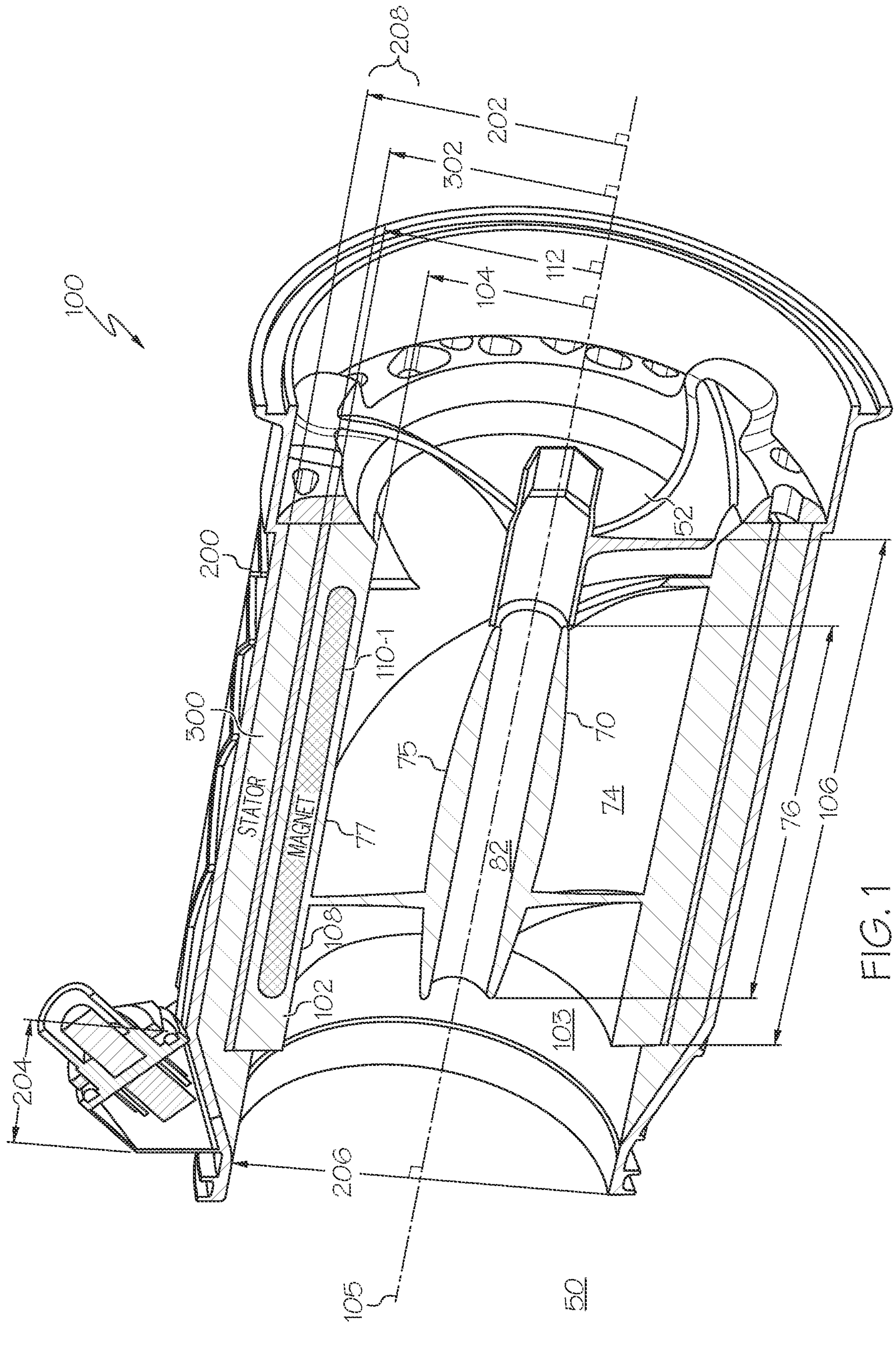
FIG. 1 is a cross section of a perspective view of a fan structure, in which a magnet and a stator are in a first arrangement, in accordance with various embodiments.

The following detailed description is merely exemplary in nature and is not intended to limit the various embodiments or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention that is defined by the claims. Furthermore, there is no intention to be bound by any expressed or implied theory presented in the preceding technical field, background, brief summary, or the following detailed description.

Additive manufacturing (AM) is referenced herein. AM, sometimes referred to as 3D printing, is a process in which an object is formed via successive layering using feed material, and this layering process advantageously averts many complex tooling steps in many instances. A given AM process may be automated or computer-controlled such that a desired object or article is fabricated on a layer-by-layer basis in accordance with computer-readable "AM design data", defining the shape and dimensions of the object.

The term "AM processes" encompasses 3D printing processes including, but not limited to, stereolithography (SLA), fused filament fabrication (FFF), and laser sintering (e.g., direct metal laser sintering, DMLS) processes. In some additive manufacturing processes, such as DMLS, the feed material used for metallic parts of an object may be a powdered metal. In the powdered feed material process, powdered metal can be applied to a base and melted in desired locations. The powdered feed material may be melted with a laser beam. The melted powder is solidified to form a layer of the desired product. More metal powder is provided and melted in desired locations to form the next layer, and the process proceeds. In other additive manufacturing processes, the source material may be supplied as a powder or in a different form (e.g., as a wire feed, the source material may be metallic or non-metallic, and other types of targeted energy (e.g., laser or electron beams) may be utilized to successively deposit the source material in desired locations on a base or on previous layers to gradually build up a desired shape.

"AM design data," referenced above, can contain any suitable file type and will often contain or consist of one or more Computer Aided Design (CAD) files, which may be generated by a designer utilizing various commercially-available CAD program products. A non-exhaustive list of such commercially-available CAD program products includes TOPSOLID, CATIA, CREO, AUTODESK INVENTOR, SOLIDWORKS, and NX CAD software packages. The term "AM design data," as appearing herein, thus broadly encompasses any computer-readable data or file types, which can be utilized by an AM machine to fabricate AM components in accordance with a predetermined design, regardless of the particular manner in which the data is stored or disseminated.

Figure 2:
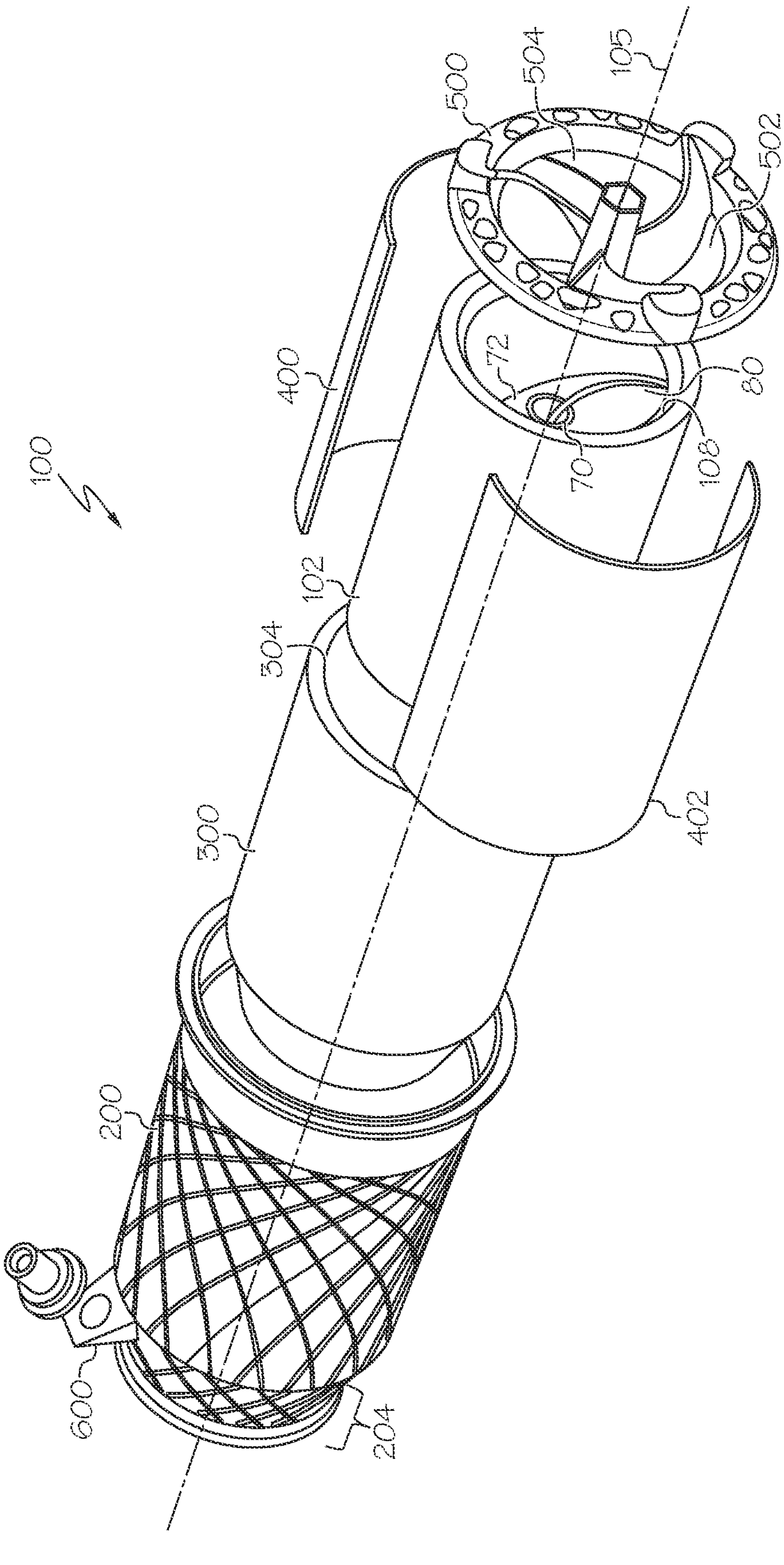
FIG. 2 is a perspective view of a fan structure, with individual components slightly separated, in accordance with various embodiments.
Figure 3:
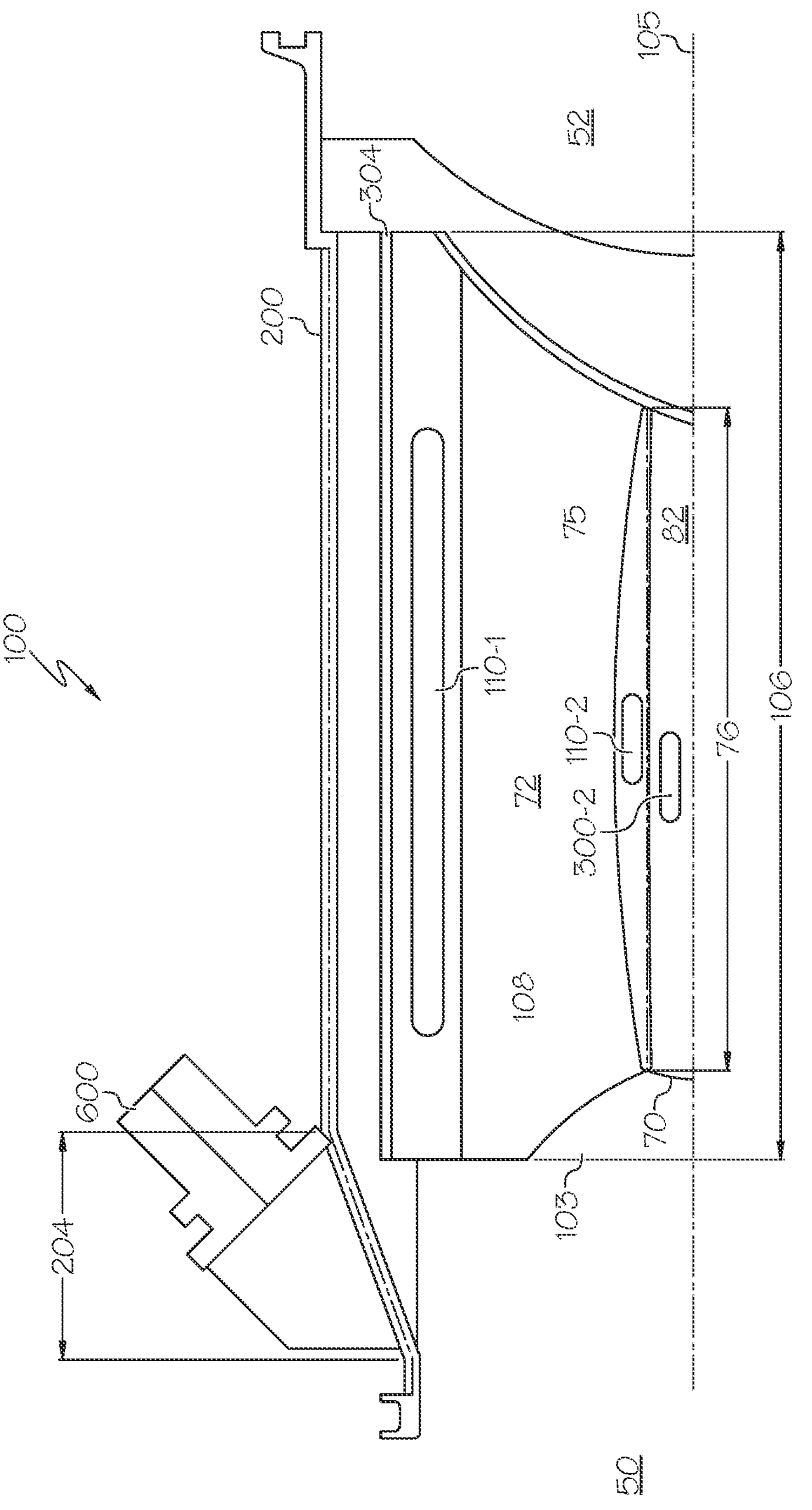
FIG. 3 is a diagram depicting a portion of the fan structure above a longitudinal axis, in which a magnet and a stator are in a second arrangement, in accordance with an embodiment.
Figure 4:
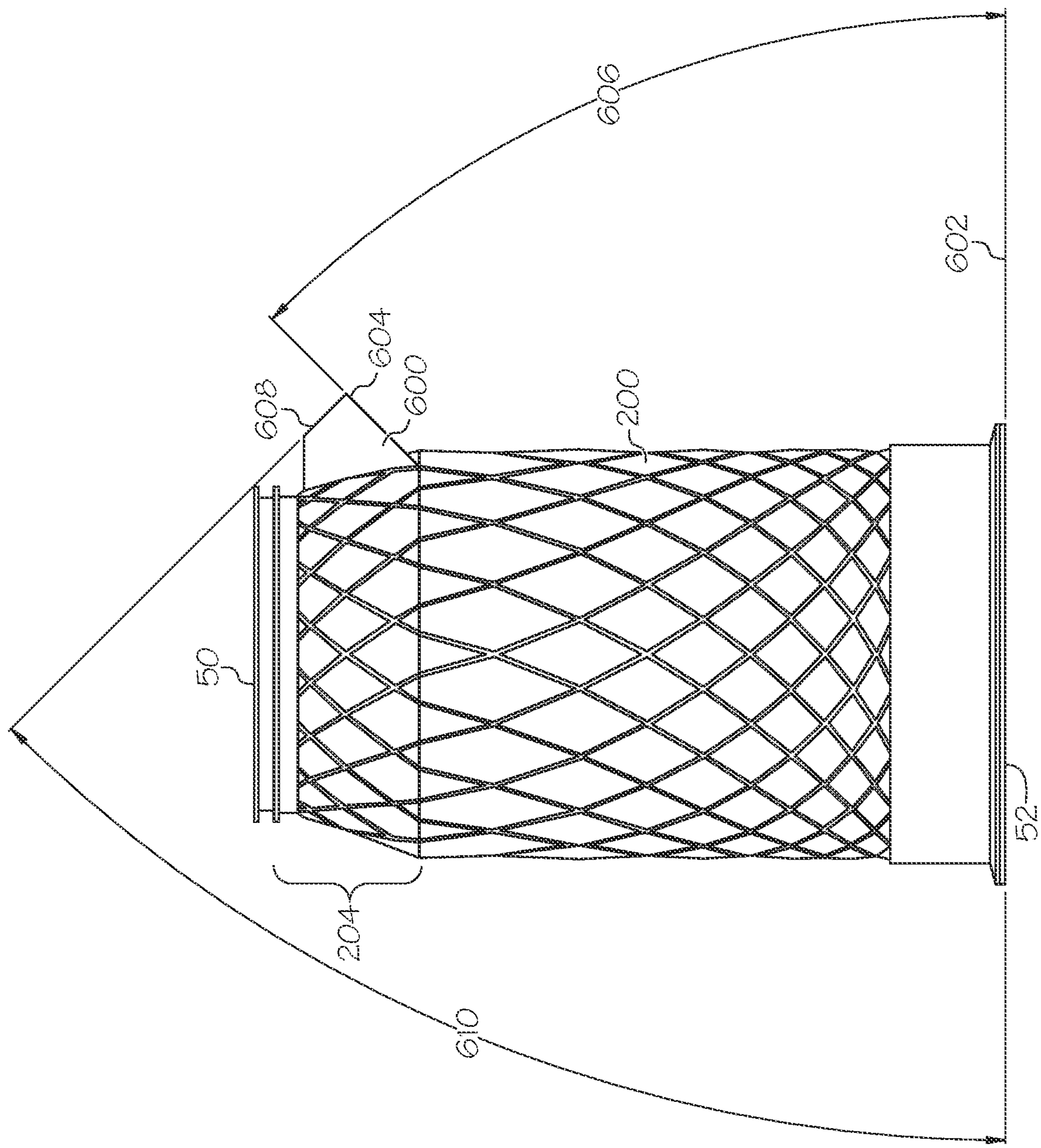
FIG. 4 is a perspective view of a fan housing, showing geometries suitable for additive manufacturing, in accordance with an embodiment.

Turning now to FIGS. 1-3, a fan structure 100 for use in an electric blower motor is shown. An integrated rotor impeller structure is introduced. The integrated rotor impeller structure is disposed to rotate within a fan housing 200. The integrated rotor impeller structure is defined by (a) a cylindrical rotor shell 102 being annular about the longitudinal axis 105, the cylindrical rotor shell 102 having a shell length 106; (b) an axis rod 70 internal to the cylindrical rotor shell 102 and coaxial with the longitudinal axis 105, the axis rod 70 having an axis rod length 76 of less than or equal to the shell length 106; (c) an airflow annulus 80 aligned with the longitudinal axis 105 and extending from an external surface 75 of the axis rod 70 to an inside surface 108 of the cylindrical rotor shell 102; (d) a blade 72 disposed within the airflow annulus 80 to extend radially from the external surface 75 of the axis rod 70 to the inside surface 108 of the cylindrical rotor shell 102; and (e) a magnet, the magnet integrated within the rotor impeller structure. The integrated motor impeller structure may be fabricated using an additive manufacturing process. In an embodiment, the integrated motor impeller structure is fabricated using Direct Metal Laser Sintering (DMLS).

The magnet can be variously located within the integrated rotor impeller structure, depending on the embodiment. In an embodiment, the magnet 110-1 is located within the cylindrical rotor shell 102, as shown in FIG. 1. This embodiment maximizes the travel path of the magnet in one rotation of the integrated rotor impeller structure. In an embodiment, the magnet 110-1 is one of a plurality of magnets 110-1, and the magnets 110-1 are distributed within the cylindrical rotor shell 102. In another embodiment, shown in FIG. 3, the magnet 110-2 is located within the axis rod 70, this embodiment minimizes the travel path of the magnet during one rotation of the integrated rotor impeller structure. In another embodiment, the magnet 110-2 is one of a plurality of magnets 110-2, and the magnets 110-2 are distributed within the axis rod 70.

The fan housing 200 is shaped and configured to create an airflow cavity and to direct airflow through the airflow cavity in a direction from an inlet side 50 to an exit side 52. The fan housing 200 encircles the longitudinal axis 105. The fan housing 200 has a cylindrical cavity defined by a length of at least the shell length 106, and a consistent diameter (twice the radius 202); this cylindrical cavity is for receiving the integrated rotor impeller structure. In some embodiments, the fan housing 200 includes a tapered area creating a conical section 204 about the longitudinal axis 105, the conical section 204 being located at the inlet side 50, forward of the cylindrical cavity, and integrated therewith. In these embodiments, an opening at the inlet side 50 of the fan housing 200 has a smaller diameter (twice the radius 206) than the diameter of the cylindrical cavity.

The integrated rotor impeller structure is configured to fit coaxially within the fan housing 200, with an orientation that directs airflow through the airflow annulus 80 that is consistent with the airflow direction of the fan housing 200. The novel integrated rotor impeller structure is a design providing an airflow cavity (airflow annulus 80) that reduces or eliminates the impediments such as multiple ribs and narrow channels with turns and angles that are found in other available fan structures. Thus, the provided integrated rotor impeller structure has the technical effect of reduced impingement and increased volumetric airflow over other available fan structures, which is in addition to reduced part count and weight optimization.

As mentioned, the blade 72 is disposed within the airflow annulus 80. Although it is itemized as a separate component for the purpose of the discussion, it is understood that all of the components of the integrated rotor impeller structure are integrated, thereby not having noticeable seams or joints, such as, where the blade 72 attaches to the external surface 75 of the axis rod 70, and where it attaches to the inside surface 108 of the cylindrical rotor shell 102. In addition, with the exception of the areas where the blade is integrally attached to the inside surface 108 of the cylindrical rotor shell 102, the inside surface 108 is smooth with a consistent inside diameter (twice the radius 104). In an embodiment, the blade 72 extends continuously from the inlet side of the integrated rotor impeller structure to its exit side. In another embodiment, the blade 72 is one of a plurality of blades, each defined similarly, but integrated at a separate location on the axis rod 70 and on the inside surface 108. In an example, FIG. 1 shows a second blade 74. The blades 72 and 74 are understood to have uniform thickness, balance, and may further embody the form of an arc or sinusoidal signal when viewed longitudinally (i.e., from the inlet side of the integrated rotor impeller structure to its exit side).

As may be appreciated, an outer diameter of the integrated rotor impeller structure is the same as an outside diameter of the cylindrical rotor shell 102, which has a consistent rotor shell diameter (twice the radius 112). In order to determine an outer diameter for the integrated rotor impeller structure, the inside diameter of a fan housing must first be determined. The outer diameter of the rotor impeller structure is defined as less than a fan housing inside diameter (twice radius 202), but greater than or equal to 80 percent of the fan housing inside diameter, creating a gap 208 therebetween.

In some embodiments, as shown in FIG. 1 and FIG. 2, a stator 300 is disposed within the gap 208, with an inside surface 304 coaxial around the rotor shell 102, having a radius 302. In FIG. 3, the magnet 110-2 is within the axis rod 70. In an embodiment, the magnet 110-2 is one of a plurality of magnets, and the magnets 110-2 are distributed within the axis rod 70. In some embodiments, the axis rod 70 may further comprise an internal cavity 82 that is symmetrical along the longitudinal axis 105, and a stator 300-2 may be disposed within the internal cavity 82.

In some embodiments, the fan structure 100 further comprises one or more liners 400, 402 that fit within the gap 208 and provide insulation. In some embodiments, the fan structure 100 comprises a lock ring 500, the lock ring 500 is configured to secure the integrated rotor impeller structure within the fan housing 200, the lock ring 500 extends across an exit side of the integrated rotor impeller structure and has therein one or more openings 502, 504, oriented as a flow straightener for airflow through the airflow annulus 80.

In some embodiments, the fan housing 200 further comprises a connector port 600 providing fluid communication between an inside of the fan housing 200 and an outside of the fan housing 200. The connector port 600 extends from an outside surface of the fan housing 200 and is located forward of the cylindrical cavity, on the conical section 204. The connector port 600 is defined by a first surface 604 that has a substantially 45-degree angle measured perpendicularly from the longitudinal axis 105. The connector port 600 has a second surface 608 that is at a right angle to the first surface and is also at a substantially 45-degree angle measured perpendicularly from the longitudinal axis 105.

As may be appreciated, separately machining and individually installing the components to create a fan structure 100 may present assembly and quality assurance issues. Accordingly, employment of AM, as described herein is a desirable approach. As mentioned, the components of the integrated rotor impeller structure may be integrated into one piece using AM. To use AM to create the integrated rotor impeller structure, the inside diameter of a target fan housing must be determined. From there, the geometries of the cylindrical rotor shell, axis rod, and one or more blades may be defined and assembled to create the airflow annulus with the blade disposed therein. The magnet is integrated into the product.

In addition to the integrated rotor impeller structure, all of the shapes, angles, and cavities of the components making up the fan housing 200 and lock ring 500 are designed to be fabricated using AM. Accordingly, embodiments of the fan structure 100 additionally reduce weight and provide an airflow annulus 80 with reduced impingement over other available fan structures.

Thus, a novel fan structure 100 for use in a blower motor is provided. The provided fan structure 100 has components that may be fabricated using an additive manufacturing technology. As is readily appreciated, the above examples are non-limiting, and many other embodiments may meet the functionality described herein while not exceeding the scope of the disclosure.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one embodiment has been presented in the foregoing detailed description of the invention, it should be appreciated that a vast number of variations exist. It should also be appreciated that the embodiment or embodiments are only examples, and are not intended to limit the scope, applicability, or configuration of the invention in any way. Rather, the foregoing detailed description will provide those skilled in the art with a convenient road map for implementing an embodiment of the invention, it being understood that various changes may be made in the function and arrangement of elements described without departing from the scope as set forth in the appended claims and their legal equivalents.

What is claimed is:

1. A fan structure for an electric motor, the fan structure comprising:

a fan housing encircling a longitudinal axis, the fan housing defining an airflow direction from an inlet side to an exit side;

an integrated rotor impeller structure disposed to rotate within the fan housing, the integrated rotor impeller structure defined by (a) a cylindrical rotor shell being annular about the longitudinal axis, the cylindrical rotor shell having a shell length;

(b) an axis rod coaxial with the longitudinal axis, the axis rod having an axis rod length of less than or equal to the shell length and comprising an internal cavity that is symmetrical along the longitudinal axis;

(c) an airflow annulus aligned with the longitudinal axis and extending from an external surface of the axis rod to an internal surface of the cylindrical rotor shell;

(d) a single blade disposed within the airflow annulus and extending radially from the external surface of the axis rod to the inside surface of the cylindrical rotor shell; and (e) a magnet, the magnet integrated within the axis rod;

wherein an outer diameter of the integrated rotor impeller structure is greater than or equal to 80 percent of a fan housing inside diameter, creating a gap therebetween; and a stator disposed within the internal cavity of the axis rod.

2. The fan structure of claim 1, wherein the integrated rotor impeller structure is fabricated using an additive manufacturing process.

3. The fan structure of claim 2, wherein the magnet is one of a plurality of magnets, and the magnets are distributed within the axis rod.

4. The fan structure of claim 1, further comprising:

a lockring, the lockring configured to secure the integrated rotor impeller structure within the fan housing, the lockring extending across an exit side of the integrated rotor impeller structure and having therein one or more openings oriented as a flow straightener for airflow through the airflow annulus; and a connector port located forward of the inlet side of the integrated rotor impeller structure, and providing fluid or electrical communication between an inside of the fan housing and an outside of the fan housing.

5. An integrated rotor impeller structure, fabricated using an additive manufacturing process, for use in a fan housing that encircles a longitudinal axis and defines an airflow direction from an inlet side to an exit side, the integrated rotor impeller structure comprising:

(a) a cylindrical rotor shell being annular about the longitudinal axis, the cylindrical rotor shell having a shell length;

(b) an axis rod coaxial with the longitudinal axis, the axis rod having an axis rod length of less than or equal to the shell length, and comprising an internal cavity that is symmetrical along the longitudinal axis;

(c) an airflow annulus aligned with the longitudinal axis and extending from an external surface of the axis rod to an internal surface of the cylindrical rotor shell;

(d) a single blade disposed within the airflow annulus and extending radially from the external surface of the axis rod to the inside surface of the cylindrical rotor shell;

(e) a magnet, the magnet disposed within the axis rod; and a stator that is disposed within the internal cavity of the axis rod.

6. The integrated rotor impeller structure of claim 5, wherein an outer diameter of the rotor impeller structure is greater than or equal to 80 percent of an fan housing inside diameter, creating a gap therebetween.

7. The integrated rotor impeller structure of claim 5, wherein the magnet is one of a plurality of magnets, and the plurality of magnets are disposed within the axis rod.

8. The integrated rotor impeller structure of claim 5, further comprising:

a lockring, the lockring configured to secure the integrated rotor impeller structure within the fan housing, the lockring extending across an exit side of the integrated rotor impeller structure and having therein one or more openings oriented as a flow straightener for airflow through the airflow annulus; and a connector port located forward of the inlet side of the integrated rotor impeller structure, and providing fluid or electrical communication between an inside of the fan housing and an outside of the fan housing.

9. A method for creating an integrated rotor impeller structure, the method comprising:

determining an inside diameter of a fan housing that encircles a longitudinal axis;

defining, (a) a cylindrical rotor shell as being annular about the longitudinal axis, having an outside diameter smaller than the inside diameter of the fan housing, forming a gap therebetween, and having a shell length;

(b) an axis rod as being coaxial with the longitudinal axis, the axis rod having an axis rod length of less than or equal to the shell length, and comprising an internal cavity that is symmetrical along the longitudinal axis;

(c) a single blade extending radially from an external surface of the axis rod to an inside surface of the cylindrical rotor shell;

assembling the cylindrical rotor shell and axis rod to create an airflow annulus between an external surface of the axis rod and an internal surface of the cylindrical rotor shell aligned with the longitudinal axis;

disposing the single blade within the airflow annulus;

disposing a stator in the internal cavity of the axis rod; and integrating a magnet within the axis rod.

10. The method of claim 9, further comprising disposing a second blade within the airflow annulus.

11. The method of claim 9, further comprising disposing a plurality of magnets in the axis rod.

12. The method of claim 9, further comprising using an additive manufacturing process to create the integrated rotor impeller structure.

13. The method of claim 9, further comprising:

extending a lockring across an exit side of the integrated rotor impeller structure to secure the integrated rotor impeller within the fan housing; and configuring therein one or more openings oriented as a flow straightener for airflow through the airflow annulus.

14. The method of claim 13, further comprising:

locating a connector port forward of the inlet side of the integrated rotor impeller structure; and providing fluid or electrical communication between an inside of the fan housing and an outside of the fan housing.

* * * * *